US012437790B2

(12) United States Patent
Lin et al.

(10) Patent No.: US 12,437,790 B2
(45) Date of Patent: Oct. 7, 2025

(54) SEMICONDUCTOR STRUCTURE AND MANUFACTURING METHOD THEREOF

(71) Applicant: UNITED MICROELECTRONICS CORP., Hsin-Chu (TW)

(72) Inventors: Hung-Chan Lin, Tainan (TW); Yu-Ping Wang, Hsinchu (TW); Chien-Ting Lin, Tainan (TW)

(73) Assignee: UNITED MICROELECTRONICS CORP., Hsin-Chu (TW)

(*) Notice: Subject to any disclaimer, the term of this patent is extended or adjusted under 35 U.S.C. 154(b) by 524 days.

(21) Appl. No.: 17/548,583

(22) Filed: Dec. 12, 2021

(65) Prior Publication Data
US 2023/0154514 A1 May 18, 2023

(30) Foreign Application Priority Data
Nov. 17, 2021 (CN) .......................... 202111359108.6

(51) Int. Cl.
| G11C 11/16 | (2006.01) |
| H10B 61/00 | (2023.01) |
| H10N 50/01 | (2023.01) |
| H10N 50/10 | (2023.01) |
| H10N 50/80 | (2023.01) |
| H10N 50/85 | (2023.01) |

(52) U.S. Cl.
CPC ............ *G11C 11/161* (2013.01); *H10B 61/00* (2023.02); *H10N 50/01* (2023.02); *H10N 50/10* (2023.02); *H10N 50/80* (2023.02); *H10N 50/85* (2023.02)

(58) Field of Classification Search
CPC ...... G11C 11/161; H10B 61/00; H10N 50/01; H10N 50/10; H10N 50/80; H10N 50/85; H10N 61/22
See application file for complete search history.

(56) References Cited

U.S. PATENT DOCUMENTS

| 2018/0123031 A1* | 5/2018 | Adelmann | H10N 50/80 |
| 2019/0363244 A1* | 11/2019 | Sasaki | G11C 11/1675 |
| 2020/0161542 A1 | 5/2020 | Ahn | |
| 2020/0227474 A1* | 7/2020 | O'Brien | H10N 52/80 |
| 2021/0257543 A1* | 8/2021 | Wu | H10N 50/85 |
| 2021/0288247 A1* | 9/2021 | Nowak | H10N 50/01 |
| 2022/0006006 A1* | 1/2022 | Komura | H10N 52/80 |
| 2022/0059757 A1* | 2/2022 | Komura | G11C 11/161 |

FOREIGN PATENT DOCUMENTS

| CN | 111480240 | 7/2020 |
| CN | 111640769 | 9/2020 |

* cited by examiner

*Primary Examiner* — Fernando L Toledo
*Assistant Examiner* — Marshall Mu-Nuo Hatfield
(74) *Attorney, Agent, or Firm* — Winston Hsu

(57) ABSTRACT

The invention provides a semiconductor structure, which comprises an MTJ (magnetic tunneling junction) stacked structure arranged on a substrate, and a SOT (spin orbit torque) layer arranged on the MTJ stacked structure, wherein the SOT layer comprises a first part with a thick thickness and two second parts with a thin thickness.

10 Claims, 6 Drawing Sheets

SEMICONDUCTOR STRUCTURE AND MANUFACTURING METHOD THEREOF

BACKGROUND OF THE INVENTION

1. Field of the Invention

The present invention relates to a semiconductor structure and the method for manufacturing the same, in particular to a method for manufacturing a magnetoresistive random access memory (MRAM) structure.

2. Description of the Prior Art

Magnetoresistance (MR) effect has been known as a kind of effect caused by altering the resistance of a material through variation of outside magnetic field. The physical definition of such effect is defined as a variation in resistance obtained by dividing a difference in resistance under no magnetic interference by the original resistance. Currently, MR effect has been successfully utilized in production of hard disks thereby having important commercial values. Moreover, the characterization of utilizing GMR materials to generate different resistance under different magnetized states could also be used to fabricate MRAM devices, which typically has the advantage of keeping stored data even when the device is not connected to an electrical source.

The aforementioned MR effect has also been used in magnetic field sensor areas including but not limited to for example electronic compass components used in global positioning system (GPS) of cellular phones for providing information regarding moving location to users. Currently, various magnetic field sensor technologies such as anisotropic magnetoresistance (AMR) sensors, GMR sensors, magnetic tunneling junction (MTJ) sensors have been widely developed in the market. Nevertheless, most of these products still pose numerous shortcomings such as high chip area, high cost, high power consumption, limited sensibility, and easily affected by temperature variation and how to come up with an improved device to resolve these issues has become an important task in this field.

SUMMARY OF THE INVENTION

The invention provides a semiconductor structure, which comprises a MTJ (magnetic tunneling junction) stacked structure arranged on a substrate, and a SOT (spin orbit torque) layer arranged on the MTJ stacked structure, wherein the SOT layer comprises a thick first part and two thin second parts.

The invention also provides a semiconductor structure, which comprises a MTJ (magnetic tunneling junction) stacked structure on a substrate, a first SOT (spin orbit torque) layer on the MTJ stacked structure, a metal layer on the first SOT layer, and a second SOT (spin orbit torque) layer on the metal layer.

The invention also provides a manufacturing method of a semiconductor structure, which comprises forming an MTJ (magnetic tunneling junction) stacked structure on a substrate, and forming a SOT (spin orbit torque) layer on the MTJ stacked structure, wherein the SOT layer comprises a thick first part and two thin second parts.

The feature of the present invention is to provide a semiconductor structure comprising MTJ (magnetic tunneling junction) and SOT (spin orbit torque) layers. The SOT layer is made of tungsten (W), which has higher performance than that made of titanium nitride (TiN) in the conventional technology. In addition, in some embodiments, the fabrication of Ru (ruthenium) layer can be omitted, so that the performance of semiconductor structure can be further improved.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention to users skilled in the technology of the present invention, preferred embodiments are detailed as follows. The preferred embodiments of the present invention are illustrated in the accompanying drawings with numbered elements to clarify the contents and the effects to be achieved.

Please note that the figures are only for illustration and the figures may not be to scale. The scale may be further modified according to different design considerations. When referring to the words "up" or "down" that describe the relationship between components in the text, it is well known in the art and should be clearly understood that these words refer to relative positions that can be inverted to obtain a similar structure, and these structures should therefore not be precluded from the scope of the claims in the present invention.

Figure 1:
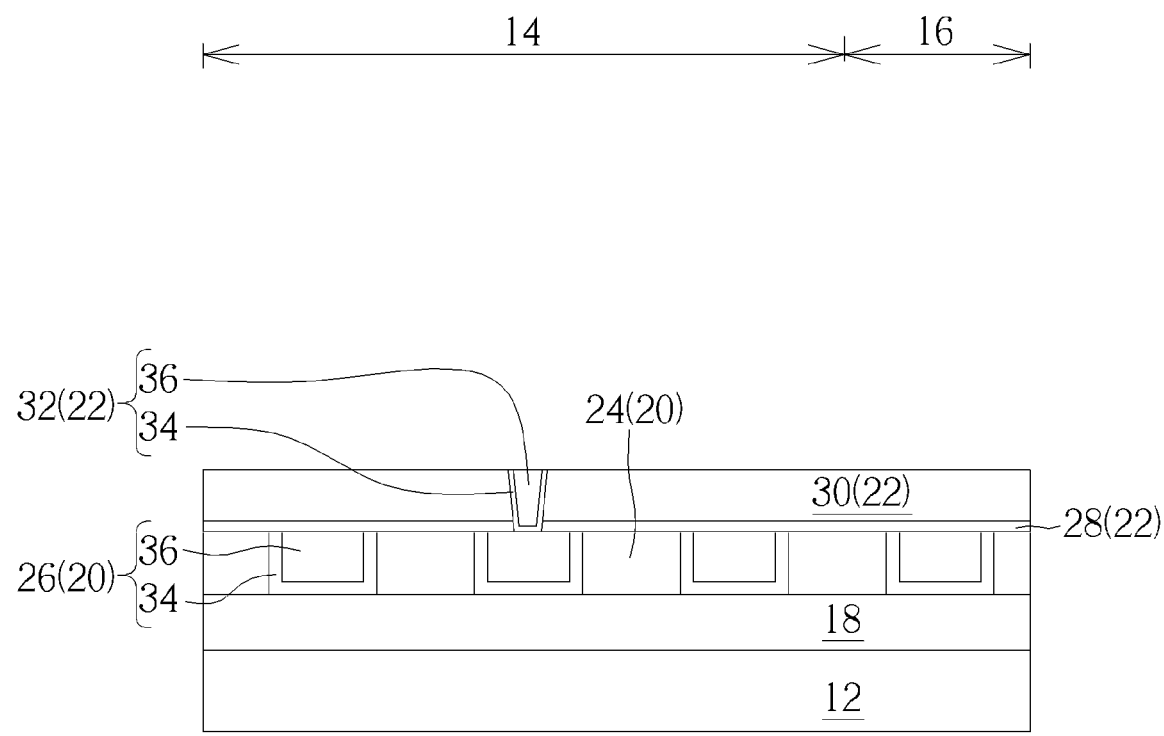
FIG. 1 to FIG. 10 are schematic diagrams of a method for manufacturing a semiconductor structure according to an embodiment of the present invention.

Please refer to FIG. 1 to FIG. 10, which are schematic diagrams of a method of manufacturing a semiconductor structure according to an embodiment of the present invention. As shown in FIG. 1, firstly, a substrate 12 is provided, such as a substrate 12 made of semiconductor material, wherein the semiconductor material can be selected from the group consisting of silicon, germanium, silicon germanium compound, silicon carbide, gallium arsenide, etc., and an MRAM region 14 and a logic region 16 are preferably defined on the substrate 12.

The substrate 12 may include active devices such as metal-oxide semiconductor, MOS) transistors, passive devices, conductive layers and dielectric layers such as interlayer dielectric (ILD) 16. More specifically, the substrate 12 may include planar or non-planar MOS transistor elements (such as fin structure transistors), in which the MOS transistors may include gate structures (such as metal gates) and transistor elements such as source/drain regions, spacers, epitaxial layers, contact hole etch stop layers, etc. The interlayer dielectric 18 may be disposed on the substrate 12 and cover the MOS transistors, and the interlayer dielectric 18 may have a plurality of contact plugs to electrically connect the MOS transistors. As related processes such as planar or non-planar transistors and interlayer dielectrics are well known in the art, they will not be repeated here.

Then, metal interconnection structures 20 and 22 are sequentially formed on the interlayer dielectric 18 to electrically connect the contact plugs, wherein the metal interconnection structure 20 includes an inter-metal dielectric layer 24 and the metal interconnection 26 embedded in the inter-metal dielectric layer 24, while the metal interconnection 22 includes a stop layer 28, an inter-metal dielectric layer 30 and the metal interconnection 32 embedded in the stop layer 28 and the inter-metal dielectric layer 30.

In this embodiment, each metal interconnection 26 in the metal interconnection structure 20 preferably comprises a trench conductor, and the metal interconnection 32 in the metal interconnection structure 22, which is located in the MRAM region 14, comprises a via conductor. In addition, each metal interconnection 26, 32 in each metal interconnection structure 20, 22 can be embedded in the inter-metal dielectric layers 24, 30 and/or the stop layer 28 and electrically connected with each other according to a single damascene process or a double damascene process. For example, each metal interconnection 26, 32 may further comprise a barrier layer 34 and a metal layer 36, wherein the barrier layer 34 may be selected from the group consisting of titanium (Ti), titanium nitride (TiN), tantalum (Ta) and tantalum nitride (TaN), and the metal layer 36 may be selected from tungsten (W), copper (Cu), aluminum (Al), titanium-aluminum alloy (TiAl). As the single damascene or double damascene process is well known in the art, it will not be described in detail here. In addition, in this example, the metal layer 36 in the metal interconnection 26 preferably comprises copper, the metal layer 36 in the metal interconnection 32 preferably comprises tungsten, the inter-metal dielectric layers 24 and 30 preferably comprise silicon oxide such as tetraethoxysilane (TEOS), and the stop layer 28 includes a nitrogen doped carbide (NDC), silicon nitride, or silicon carbide (SiCN), but it is not limited thereto.

Figure 2:
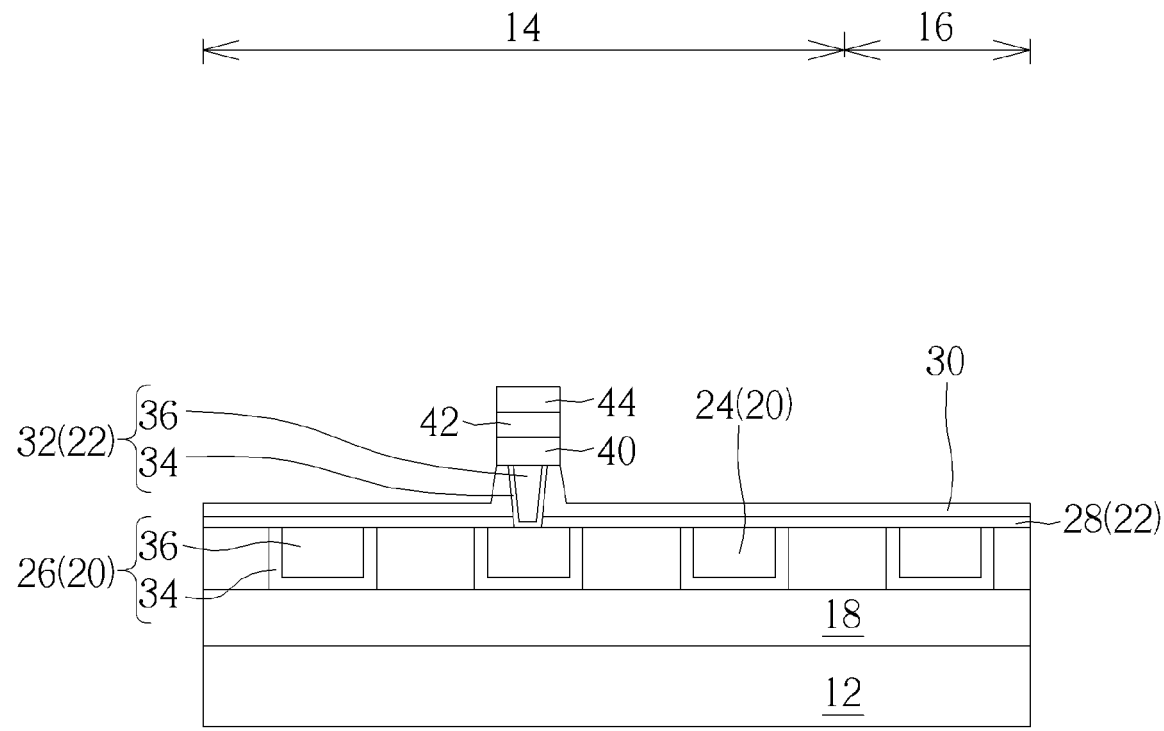

Then, as shown in FIG. 2, a patterned MTJ stacked structure 40, a patterned mask layer 42 and a patterned dummy oxide layer 44 are sequentially formed. A stacked MTJ material layer (not shown), a mask material layer (not shown) and a dummy oxide material layer (not shown) can be firstly formed, and then an etching step is performed to remove part of the material layers, and the remaining material layers are defined as the above-mentioned patterned MTJ stacked structure 40, the patterned mask layer 42 and the patterned dummy oxide layer 44, respectively. In addition, it should be noted that the etching process for patterning the MTJ material layer (not shown), the mask material layer (not shown) and the dummy oxide material layer (not shown) in this embodiment can include reactive ion etching (RIE) and/or ion beam etching (IBE). In addition, in the above etching step, it is also possible to remove a part of the inter-metal dielectric layer 30 at the same time, resulting in the lowering of the top surface of the inter-metal dielectric layer 30 on both sides of the patterned MTJ stacked structure 40.

In this embodiment, the MTJ stacked structure 40 can be formed by sequentially forming a pinned layer, a barrier layer and a free layer on the metal layer 36. The fixed layer may contain ferromagnetic materials such as but not limited to cobalt-iron-boron (CoEB), cobalt-iron-boron (CoFeB), iron (Fe), cobalt (Co), etc. In addition, the fixing layer can also be made of antiferromagnetic (AFM) materials, such as FeMn, PtMn, IrMn, NiO, etc., to fix or limit the magnetic moment direction of adjacent layers. The barrier layer may be composed of an insulating material containing oxides, such as aluminum oxide (AlOx) or magnesium oxide (MgO), but not limited thereto. The free layer may be made of ferromagnetic materials, such as iron, cobalt, nickel or their alloys such as cobalt-iron-boron, CoFeB, but not limited thereto. The magnetization direction of the free layer will be "freely" changed by external magnetic field. In addition, in this embodiment, the material of the mask layer 42 is titanium nitride (TiN), and the material of the dummy oxide layer 44 is silicon oxide, but it is not limited to this.

Figure 3:
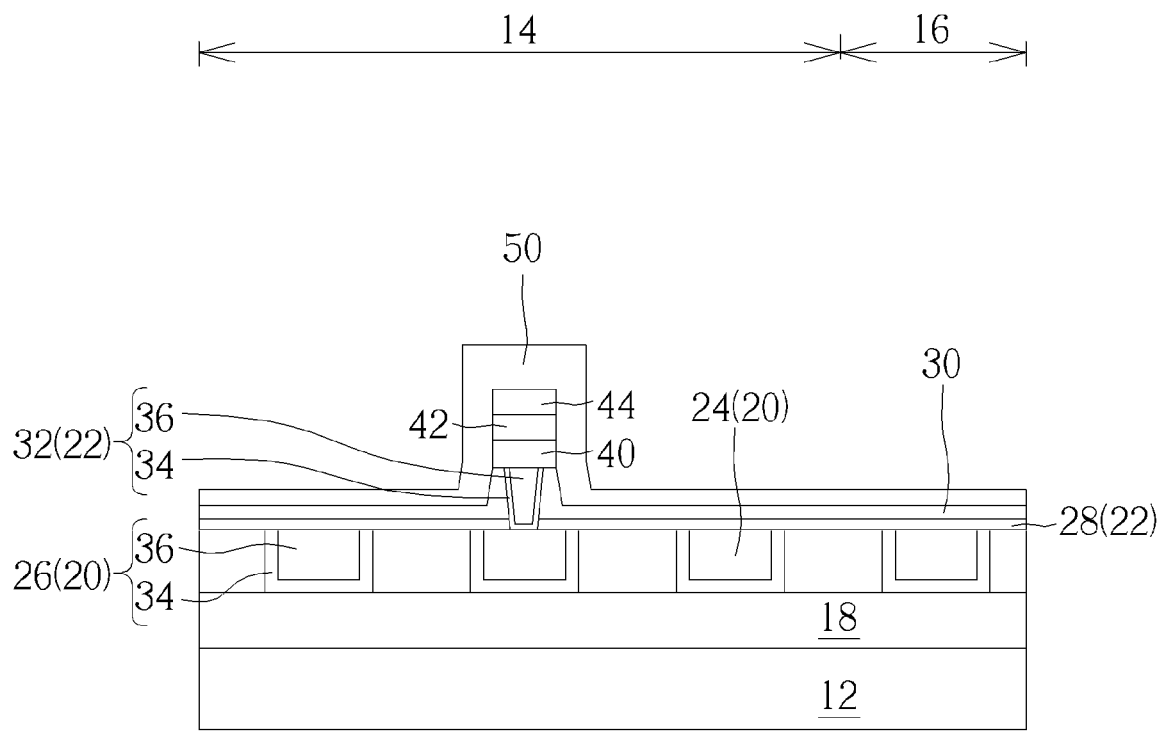

Then, as shown in FIG. 3, a cover layer 50 is formed on the dummy oxide layer 44 and covers the surface of the inter-metal dielectric layer 30 of the MRAM region 14 and the logic region 16. In this embodiment, the covering layer 50 preferably comprises silicon nitride, but other dielectric materials such as but not limited to silicon oxide, silicon oxynitride or silicon carbonitride can be selected according to the process requirements.

Figure 4:
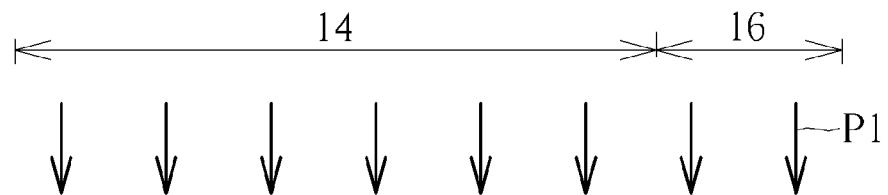
Figure 4:
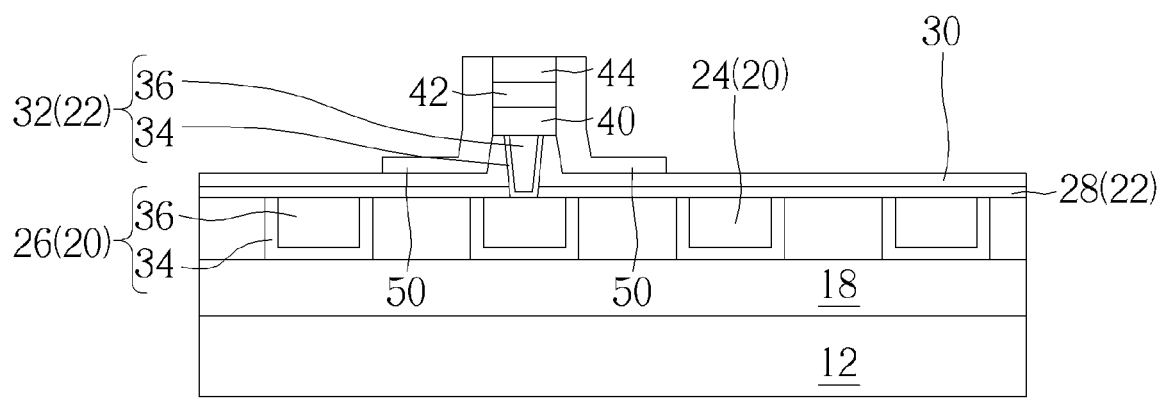

Then, as shown in FIG. 4, an etching step P1 is performed to remove a part of the cover layer 50, and the remaining cover layer 50 covers a part of the surface of the inter-metal dielectric layer 30 and the sidewalls of the patterned MTJ stacked structure 40, the patterned mask layer 42 and the patterned dummy oxide layer 44. In addition, it should be noted that the top surface of the cover layer 50 is aligned with the top surface of the dummy oxide layer 44, and the top surface of the dummy oxide layer 44 is not covered by the cover layer 50, so it is exposed.

Figure 5:
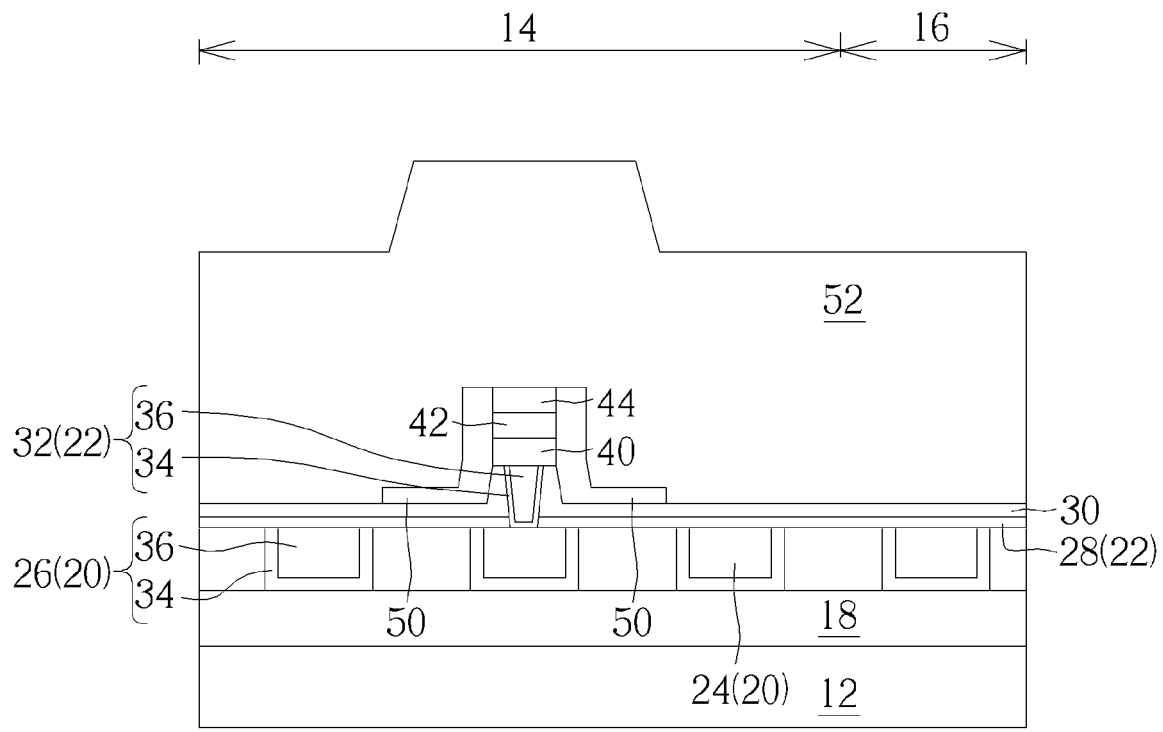

As shown in FIG. 5, an inter-metal dielectric layer 52 is formed to cover the dummy oxide layer 44 and the cover layer 50, the inter-metal dielectric layer 52 is preferably conformally arranged on the dummy oxide layer 44 and the cover layer 50, and the inter-metal dielectric layer 52 comprises an ultra-low dielectric constant dielectric layer, for example, porous dielectric materials such as but not limited to silicon oxycarbide (SiOC) or silicon oxycarbide (SiOCH).

Figure 6:
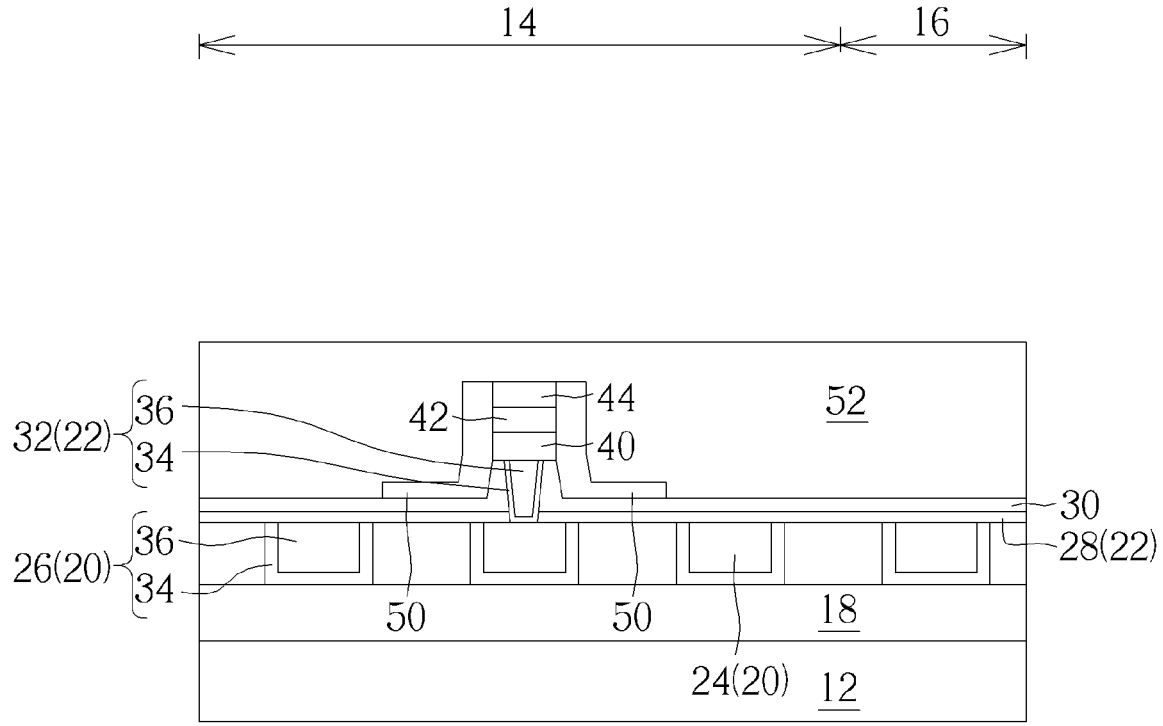

As shown in FIG. 6, next, a planarization process is performed, for example, a chemical mechanical polishing (CMP) process or an etching back process can be used to remove part of the inter-metal dielectric layer 52 but still make the top surface of the remaining inter-metal dielectric layer 52 higher than the top surface of the dummy oxide layer 44.

Figure 7:
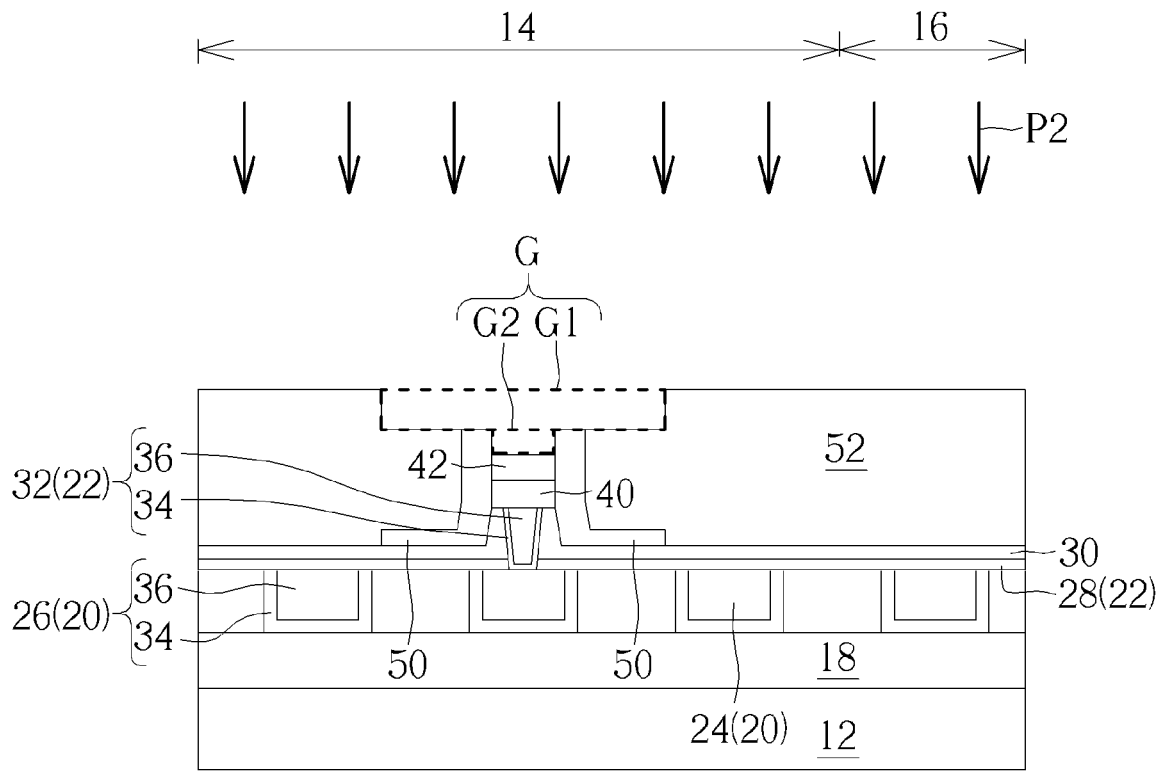

As shown in FIG. 7, an etching step P2 is performed, wherein the etching step P2 includes, for example, single or multiple etching, first removing part of the inter-metal dielectric layer 52 and forming a groove G1, and then continuing to remove the dummy oxide layer 44 and forming a groove G2. At this time, the etching step P2 can stop on the mask layer 42, that is, the mask layer 42 can protect the MTJ stacked structure 40 below. The width of groove G1 is larger than that of groove G2, and the bottom surface of groove G1 is aligned with the top surface of cover layer 50, so the bottom surface of groove G2 is lower than that of groove G1. From the sectional view, groove G1 and groove G2 can be combined into a groove G with a "T" shape. In other words, the groove G has a stepped sectional profile.

Figure 8:
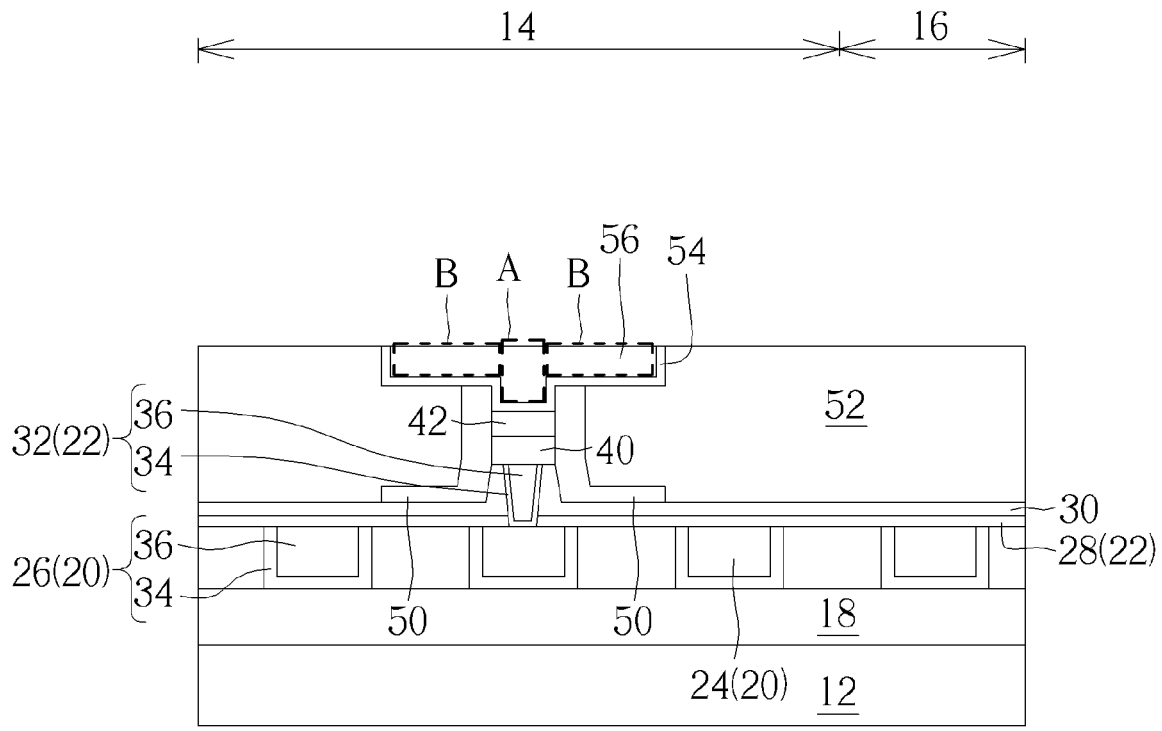

Then, as shown in FIG. 8, a barrier layer 54 and a spin orbit torque (SOT) layer 56 are sequentially formed. The barrier layer 54 and the SOT layer 56 are conformally filled in the groove G, and then a planarization step is performed to remove the redundant barrier layer 54 and the SOT layer 56. The material of the barrier layer 54 is titanium/titanium nitride (Ti/TiN), and the SOT layer 56 is preferably used as the channel of a spin orbit torque (SOT) MRAM, so its material may include tantalum (Ta), tungsten (W), platinum (Pt), hafnium (Hf), bismuth selenide (BixSe1-x) or the combination thereof, and tungsten (W) is taken as an example in this embodiment. The applicant has found that the switching efficiency of MRAM using tungsten as the material of SOT layer is better than that of the conventional technology (which usually uses TiN as the material of the SOT layer), that is to say, the performance of MRAM can be improved.

It should be noted that since the groove G has a stepped cross-sectional profile, after the SOT layer 56 is conformally filled in the groove G, from the cross-sectional view, the SOT layer 56 can define several parts, namely, the first part A which is located in the middle and has a thick thickness, and two second part B which are located on both sides, and each second part B has a thin thickness. The first part A is located directly above the MTJ stacked structure 40, but the second part B is not located directly above the MTJ stacked structure 40 (but diagonally above both sides).

Figure 9:
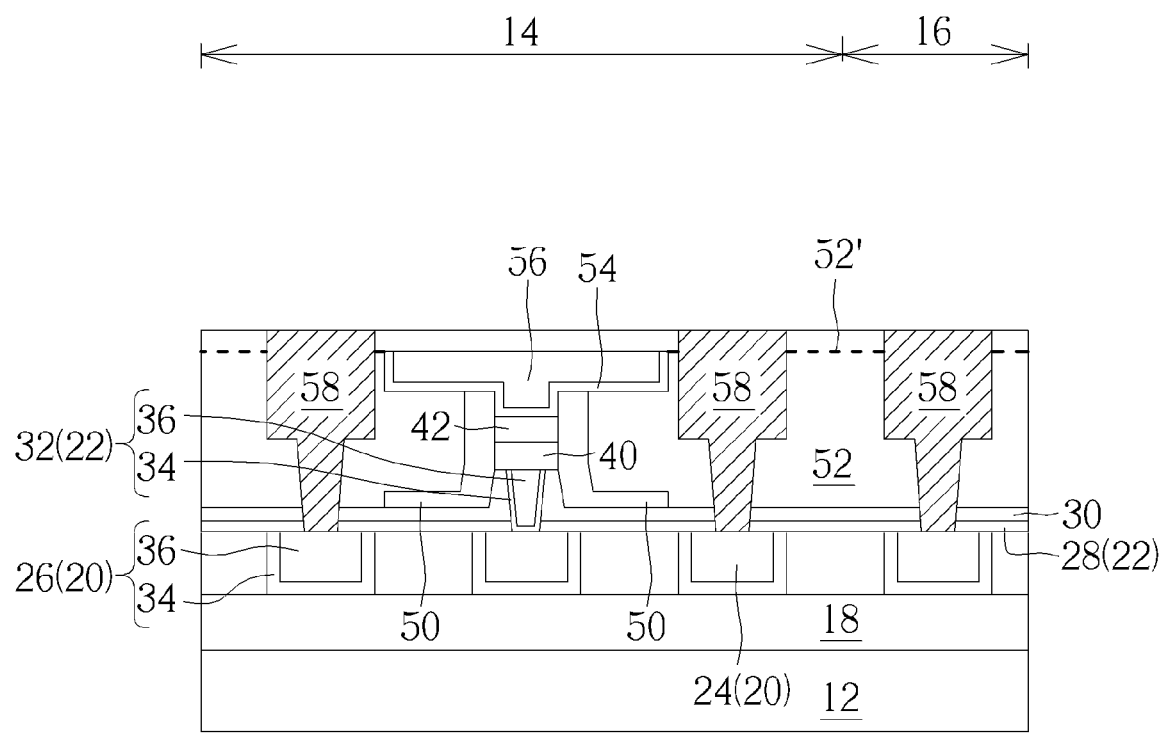

Then, as shown in FIG. 9, for example, a deposition step is performed to cover the inter-metal dielectric layer 52 with a dielectric layer 52', which is preferably made of the same material as the inter-metal dielectric layer 52, and the dielectric layer 52' can protect the SOT layer 56. Then, a pattern transfer process is performed. For example, a patterned mask (not shown) can be used to remove part of the dielectric layer 52', part of the inter-metal dielectric layer 52, part of the inter-metal dielectric layer 30 and part of the stop layer 28 in the MRAM region 14 and the logic region 16 to form contact holes (not shown) and expose the underlying metal interconnections 26. Then, the contact holes are filled with required metal materials, such as barrier layer materials including titanium (Ti), titanium nitride (TiN), tantalum (Ta), tantalum nitride (TaN), etc., and materials selected from tungsten (W), copper (Cu), aluminum (Al), titanium-aluminum alloy (TiAl), cobalt tungsten phosphide (CoWP), etc. Then, a planarization process, such as chemical mechanical polishing, is performed to remove part of the metal material to form contact plugs or metal interconnections 58 in the contact holes to electrically connect the metal interconnections 26.

Figure 10:
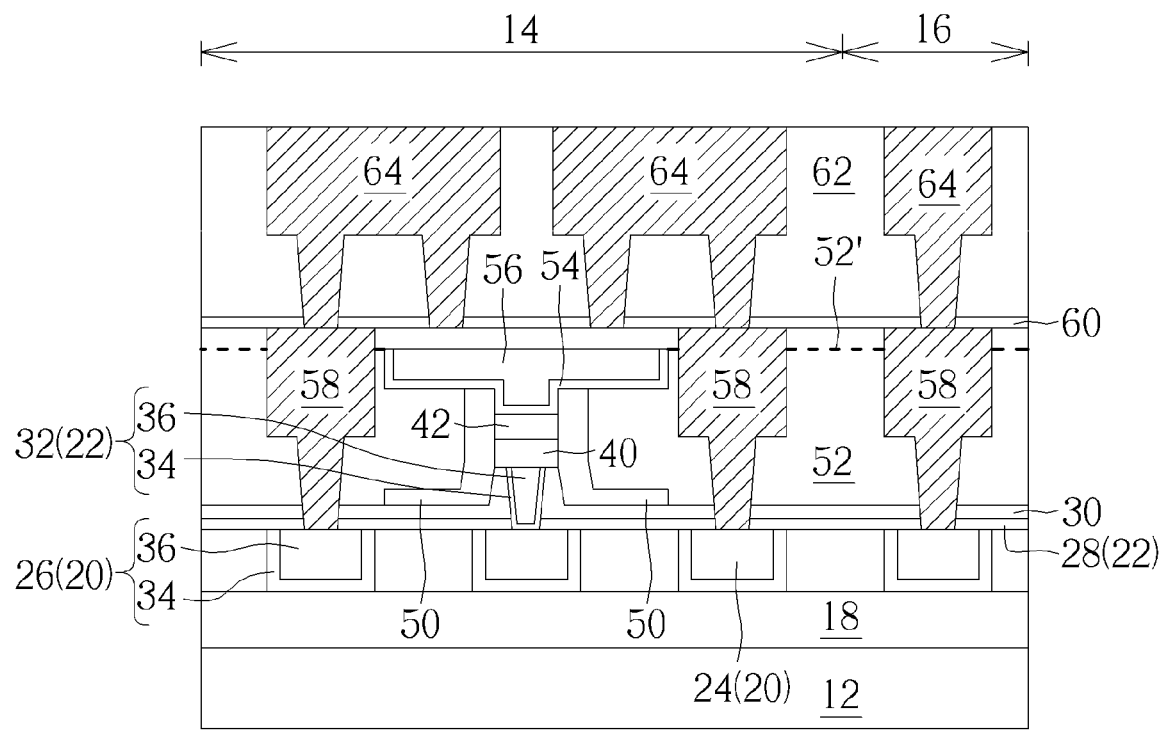

As shown in FIG. 10, a stop layer 60 is formed in the MRAM region 14 and in the logic region 16, covering the inter-metal dielectric layer 52' and the metal interconnections 58, and an inter-metal dielectric layer 62 is formed on the stop layer 60, and one or more photolithography and etching processes are performed to remove part of the inter-metal dielectric layer 62 and part of the stop layer 60 in the MRAM region 14 and the logic region to form contact holes (not shown). Then, conductive materials are filled in each contact hole and combined with a planarization process such as CMP to form metal interconnections 64 in the MRAM region 14 and in the logic region 16 to electrically connect the SOT layer 56 and metal interconnections 58 below, wherein the metal interconnections 64 in the MRAM region 14 preferably directly contact the SOT layer 56 below, while the metal interconnections 64 in the logic region 16 contact the metal interconnections 58 below.

In this embodiment, the SOT layer 56 is filled in the groove G to form a dual damascene-like structure. In addition, in this embodiment, the SOT layer 56 is made of tungsten, so it has higher performance than the SOT layer made of titanium nitride (TiN) in the prior art. In addition, in some conventional technologies, there is a Ru (ruthenium) layer under the SOT layer, which is used as a barrier layer and an etching stop layer in the process. However, in this embodiment, the fabrication of the Ru layer is omitted, thus further simplifying the process.

Figure 11:
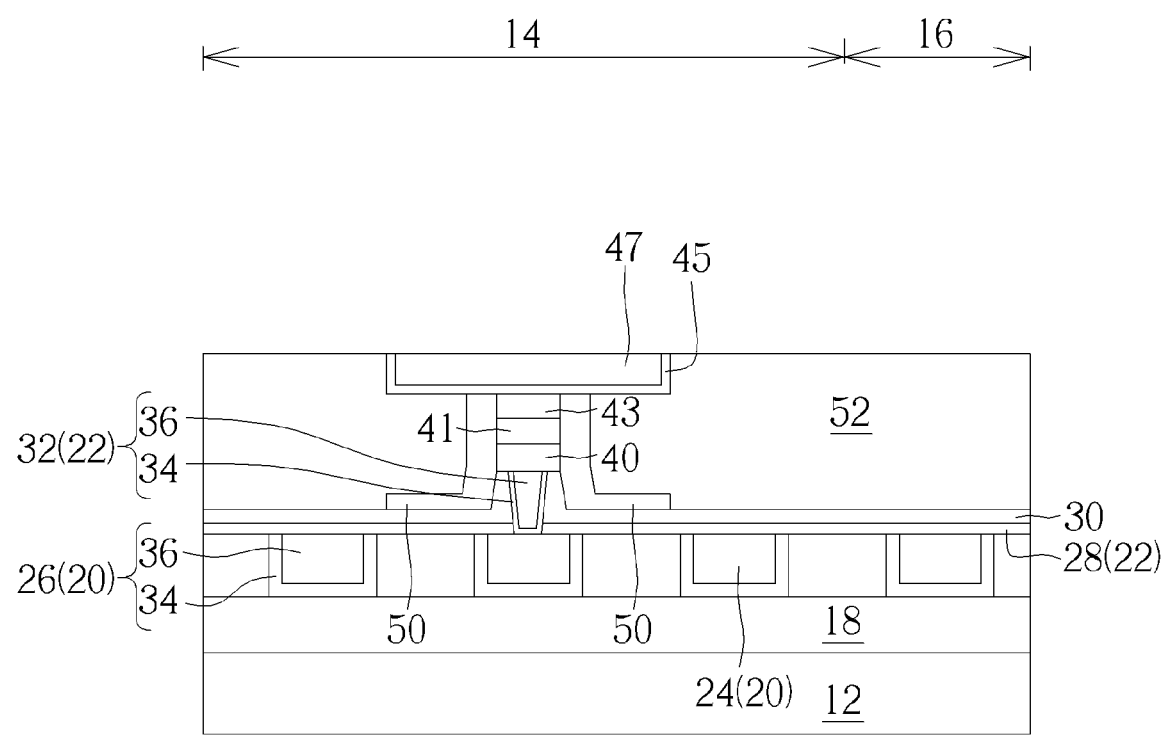
FIG. 11 is a schematic diagram of a semiconductor structure according to another embodiment of the present invention.

In another embodiment of the present invention, please refer to FIG. 11, which is a schematic diagram of a semiconductor structure in another embodiment of the present invention. In this embodiment, the stacking order of some stacked material layers is changed. Therefore, as seen from FIG. 11, there is no mask layer 42 and dummy oxide layer 44 as shown in FIG. 2 above the MTJ stacked structure 40, but a first SOT layer 41, a ruthenium (Ru) layer 43, a barrier layer 45 and a second SOT layer 47 are sequentially included. The materials of the first SOT layer 41 and the second SOT layer 47 are similar to those of the SOT layer 56 in the above embodiment, for example, tantalum (Ta), tungsten (W), platinum (Pt), hafnium (Hf), bismuth selenide (BixSel-x) or their combination, and tungsten (W) is taken as an example in this embodiment. The barrier layer 45 is the same as the barrier layer 54 in the above embodiment, and its material is titanium/titanium nitride (Ti/TiN), for example. This embodiment is characterized in that the SOT layer is divided into two upper and lower SOT layers (the first SOT layer 41 and the second SOT layer 47), and the manufacturing process is more simplified than that of the first embodiment.

Based on the above description and drawings, please refer to the contents of FIGS. 1 to 10. The present invention provides a semiconductor structure, which includes an MTJ stacked structure 40 on a substrate 12, and a SOT layer 56 on the MTJ stacked structure 40, wherein the SOT layer 56 includes a thick first part A and two thin second parts B.

In some embodiments, the first part A is located directly above the MTJ stacked structure 40, the two second parts B are not located directly above the MTJ stacked structure 40.

In some embodiments, the material of the SOT layer 56 includes tungsten.

In some embodiments, it further includes a first inter-metal dielectric layer 24 disposed on the substrate 12 and a first metal interconnection 26 disposed in the first inter-metal dielectric layer 24, the MTJ stacked structure 40 is disposed on the first metal interconnection 26.

In some embodiments, a cover layer 50 is further included beside the MTJ stacked structure 40, two second parts B of the SOT layer 56 cover the top surface of the cover layer 50.

In some embodiments, a top surface of the cover layer 50 is lower than a top surface of the SOT layer 56.

In some embodiments, the top surfaces of the first part A and the second parts B of the SOT layer 56 are aligned with each other.

The present invention also provides a semiconductor structure, which includes an MTJ stacked structure 40 on a substrate 12, a first SOT (spin orbit torque) layer 41 on the MTJ stacked structure 40, a metal layer 43 on the first SOT layer 41, and a second SOT layer 47 on the metal layer 43.

In some embodiments, a width of the second SOT layer 47 is greater than a width of the first SOT layer 41.

In some embodiments, the materials of the first SOT layer 41 and the second SOT layer 47 both contain tungsten (W).

In some embodiments, the material of the metal layer 43 includes Ru (ruthenium).

The present invention also provides a manufacturing method of a semiconductor structure, referring to the contents of FIGS. 1 to 10, which includes forming an MTJ stacked structure 40 on a substrate 12 and forming a SOT (spin orbit torque) layer 56 on the MTJ stacked structure 40, wherein the SOT layer 56 includes a thick first part A and two thin second parts B.

In some embodiments, it further includes forming a first inter-metal dielectric layer 24 on the substrate 12 and forming a first metal interconnection 26 in the first inter-metal dielectric layer 24, wherein the MTJ stacked structure 40 is located on the first metal interconnection 26.

In some embodiments, it further includes forming a cover layer 50 next to the MTJ stacked structure 40, wherein two second parts B of the SOT layer 56 cover the top surface of the cover layer 50.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A semiconductor structure comprising:
A MTJ(magnetic tunneling junction) stacked structure arranged on a substrate;
A SOT(spin orbit torque) layer disposed above the MTJ stacked structure, Wherein the SOT layer comprises a first part with a thick thickness and two second Parts with a thin thickness, and wherein the MTJ stacked structure is disposed Between the substrate and the SOT layer, wherein a top surface of the first part and top surfaces of the second parts of the SOT layer are aligned with each other, wherein
The first part and two second parts of the SOT layer together form an upright t-shape, and
A first contact structure above and electrically connected to a first part of the second parts, a second contact structure above and electrically connected to a second part of the second parts, wherein the first contact structure electrically connects the SOT layer to a first interconnect structure, the second contact structure electrically connects the SOT layer to a second interconnect structure, wherein the first interconnect structure is located at a lateral side of the SOT layer, and the second interconnect structure is located at a second lateral side of the SOT layer opposite the first lateral side, wherein
A lower surface of the MTJ stacked structure is electrically connected to a first conductive structure, a lower surface of the first interconnect structure is electrically connected to a second conductive structure, and a lower surface of the second interconnect structure is electrically connected to a third conductive structure.

2. The semiconductor structure according to claim 1, wherein the first part is located directly above the MTJ stacked structure, and the two second parts are not located directly above the MTJ stacked structure.

3. The semiconductor structure according to claim 1, wherein the material of the SOT layer comprises tungsten.

4. The semiconductor structure according to claim 1, further comprising a cover layer arranged beside the MTJ stacked structure, wherein the two second parts of the SOT layer cover a top surface of the cover layer.

5. The semiconductor structure according to claim 4, wherein the top surface of the cover layer is lower than a top surface of the SOT layer.

6. A manufacturing method for forming a semiconductor structure comprising:

Forming a MTJ (magnetic tunneling junction) stacked structure arranged on a substrate;
Forming a SOT (spin orbit torque) layer disposed above the MTJ stacked structure, Wherein the SOT layer comprises a first part with a thick thickness and two second Parts with a thin thickness, and wherein the MTJ stacked structure is disposed Between the substrate and the SOT layer, wherein a top surface of the first part and top surfaces of the second parts of the SOT layer are aligned with each other, wherein The first part and two second parts of the SOT layer together form an upright t-shape, and
Forming a first contact structure above and electrically connected to a first part of the second parts, forming a second contact structure above and electrically connected to a second part of the second parts,
forming a first interconnect structure, forming a second interconnect structure,
wherein the first contact structure electrically connects the SOT layer to the first interconnect structure, the second contact structure electrically connects the SOT layer to the second interconnect structure, wherein the first interconnect structure is located at a lateral side of the SOT layer, and the second interconnect structure is located at a second lateral side of the SOT layer opposite the first lateral side,
forming a first conductive structure,
forming a second conductive structure,
forming a third conductive structure, wherein
a lower surface of the MTJ stacked structure is electrically connected to the first conductive structure, a lower surface of the first interconnect structure is electrically connected to the second conductive structure, and a lower surface of the second interconnect structure is electrically connected to a third conductive structure.

7. The method according to claim 6, wherein the first part is located directly above the MTJ stacked structure, and the two second parts are not located directly above the MTJ stacked structure.

8. The method according to claim 6, wherein the material of the SOT layer comprises tungsten.

9. The method according to claim 6, further comprising forming a cover layer beside the MTJ stacked structure, wherein the second parts of the SOT layer cover a top surface of the cover layer.

10. The method according to claim 9, wherein the top surface of the cover layer is lower than a top surface of the SOT layer.

* * * * *